July 7, 1931.  M. Z. KATZ ET AL  1,813,624
SPLASHER PLATE FOR VEHICLE BUMPERS
Original Filed Aug. 27, 1929
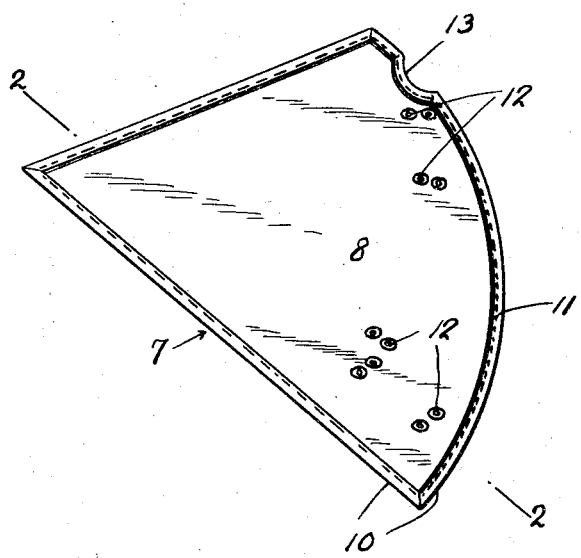
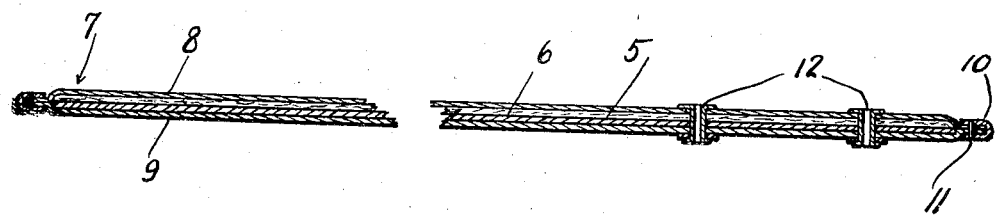
Inventors
Max Z. Katz
Samuel Katz
By Clarence A O'Brien
Attorney Patented July 7, 1931

1,813,624

UNITED STATES PATENT OFFICE

MAX Z. KATZ AND SAMUEL KATZ, OF HARTFORD, CONNECTICUT

SPLASHER PLATE FOR VEHICLE BUMPERS

Application filed August 27, 1929, Serial No. 388,744. Renewed May 22, 1931.

This invention relates to bumpers, and more particularly to a splasher plate adapted to be used in conjunction with the bumper serving to prevent mud, tar and the like from flying upwardly upon the bumpers or the fenders of an automobile.

The primary object of the invention is to provide therefore a splash plate adapted to be secured to either the front or rear bumper of a vehicle or to the conventional bumperette in a ready and convenient manner without necessitating the alteration of the bumper or bumperette.

A still further object of the invention is to provide a plate of this nature enclosed within a suitable casing formed of leather or other desirable material together with a cushion pad of the shape and size of the plate disposed upon one face of the plate within the casing, the cushion pad when the plate is positioned on the bumper or bumperette being positioned between the plate proper and the bars of the bumper thus deadening or completely eliminating any noise or rattling such as would occur were the plate unprotected permitted to strike against the bars of the bumper or bumperette during the moving of the automobile.

A still further object of the invention is to provide splash plate of the character above mentioned, which will be simple in construction, strong, durable, thoroughly reliable, and practical and efficient in use and which will not detract from the appearance of the vehicle when applied thereto and which is otherwise well adapted to the purpose designed.

Other objects and advantages of the invention will become apparent during a study of the following description, taken in connection with the drawings, wherein:

Figure 1 is a perspective view of a splash plate constructed in accordance with the present invention, Figure 2 is a vertical transverse sectional view taken substantially on line 2—2 of Figure 1.

With reference more in detail to the drawings, it will be seen that the splash plate consists of a main or body plate 5 which plate 5 is flexible and is preferably formed of a non-corrosive metal.

The plate 5 is substantially rectangular in configuration, as herein shown, and has an outer curved edge that merges into the ends of right angular straight edges the curvature of the curved edge being substantially equivalent to the curvature of the spring bars or shackle of a conventional bumperette.

Even though we have herein shown the plate as being of this substantially rectangular configuration it is to be understood that the plate may be an outline of any desired form, conforming to the particular structure of the bumper to which it is to be applied.

Disposed on one face of the body plate 5 and of a shape and size and configuration conforming to the plate 5 is a cushion pad 6. The cushion pad 6 which also is in the nature of a filler may be made of a plurality of plies or of one single ply of suitable thickness of either heavy rubber or heavy pile fabric.

The plate 5 and pad 6 are completely enclosed in a suitable covering or casing designated generally by the reference character 7. The casing 7 is preferably formed of an upper section 8 and a lower section 9.

The sections of the cover may be made of leather or any suitable material preferably of the material such as automobile tops are made. Each of the cover sections 8 and 9 respectively is of a shape and configuration conforming to the shape and configuration of the plate and cushions 5 and 6 respectively and the edges of said sections 8 and 9 extend beyond the adjacent marginal edges of the plate and cushion as shown to advantage in Figure 2.

A reinforcing and securing strip 10 of a material preferably similar to the material used in making the cover sections 8 and 9 is bent longitudinally upon itself for receiving between its longitudinal sides the extended edges of the cover sections 8 and 9, and stitching 11 secures the binder strip 10 to the edges of the cover section and also secures the edges of the cover sections together thus forming a complete enclosure for the plates and filler or cushion 6.

Adjacent the corners of the plate where the curved edge of the plate merges into the right angular straight edges, the splasher has a plurality of predetermined positioned eyelets 12 extending therethrough, that is through the cover, the cushion or filler pad 6 and the plate 5. These eyelets 12 are arranged in series there being two series adjacent one corner between the adjacent ends of one straight edge and the curved edge and two other series of eyelets adjacent the other end of the curved edge inwardly from the corner of the plate.

On its curved edge, adjacent the last mentioned pairs of eyelets, the plate 5, cover 7 and cushion 6 is provided with an arcuate recess as indicated at 13. This recess 13 will permit an insertion of the finger between the curved edge of the splasher and adjacent bar on the vehicle bumper or bumperette to facilitate the removal of the splash shield.

In actual practice, the shield may be attached either to a conventional bumper or bumperette, or may be attached to the spring of the vehicle beneath the bumper to prevent mud, dust, grease, oil and other débris from flying upward and engaging on the rear of the car and the bumper as well as on the fender.

If desired the splasher may be affixed on or under the bumperette or may be fitted through the spring shackles of the bumperette and is preferably shaped according to the size and form of the bumperette.

The bumper splasher may be affixed without interrupting or in any way altering the construction of the bumper or bumperette and may be secured thereto by copper wires drawn through the eyelet 12 and fastened to one of the spring shackles of the bumperette or if desired the splasher may be affixed by using a double end threaded clamp of suitable thickness with a plate at the bottom fitted to both ends of the threaded clamp and tightened by small bolts, which threaded clamp is also drawn through the eyelets.

The number of eyelets used of course will be in conformity to the size and make of the bumperette.

It will be apparent from the foregoing that our novel splash shield, by reason of its pad 6, averts noise incident to striking of the shield against a bumper or bumperette; also, that both the plate and pad are enclosed in and protected by the cover so that the usefulness of the shield is prolonged and its appearance is enhanced, and that the eyelets 12 not only render it feasible to quickly attach the shield through the medium of wires, shackles, or the like, but permit of the shield extending horizontally beyond the bumper or bumperette, whereby the protective capacity of the shield is greatly increased.

From the foregoing description, taken in connection with the accompanying drawings, it is believed that a clear understanding of the operation, construction, utility and advantages of a device of this nature will be had by those skilled in this art without a more detailed description thereof.

Even though we have herein shown and described the preferred embodiment of our invention, it is to be understood that same is susceptible of changes fully comprehended by the spirit of the invention as herein described, and the scope of the appended claim.

Having thus described our invention, what we claim as new is:

A splash shield for automobile bumpers, comprising a plate, a cover receiving and completely encasing said plate and having spaced layers, a cushioning element between one face of the plate and one layer of the cover substantially throughout the area thereof, and eyelets extending through the plate, cover and cushioning element and joining said parts.

In testimony whereof we affix our signatures.

MAX Z. KATZ.
SAMUEL KATZ.